United States Patent

[11] 3,548,113

| [72] | Inventor | Horst Althuber<br>Vienna, Austria |
| [21] | Appl. No. | 702,868 |
| [22] | Filed | Feb. 5, 1968 |
| [45] | Patented | Dec. 15, 1970 |
| [73] | Assignee | U.S. Philips Corporation<br>New York, N.Y.<br>a corporation of Delaware. by mesne assignment |
| [32] | Priority | Feb. 28, 1967 |
| [33] | | Austria |
| [31] | | No. A1946/67 |

[54] SHAPED PERMANENT MAGNET ERASING DEVICE FOR MAGNETIZABLE RECORD CARRIERS
9 Claims, 10 Drawing Figs.

[52] U.S. Cl. ................................................ 179/100.2, 317/157.5, 335/284
[51] Int. Cl. ...................................................... G11b 5/22, H01f 13/00

[50] Field of Search ............................................. 179/100.2(D); 340/174.1(F); 317/157.5, 157.51; 335/284

[56] References Cited
UNITED STATES PATENTS

| 3,351,717 | 11/1967 | Metz | 179/100.2 |
| 2,905,767 | 9/1959 | Eckert, Jr. | 340/174.1 |
| 2,594,934 | 4/1952 | Kornet | 179/100.2 |
| 3,373,250 | 3/1968 | Adams | 179/100.2 |

Primary Examiner—J. Russell Goudeau
Attorney—Frank R. Trifari

ABSTRACT: A low residual noise level magnetic tape-erasing device for use with a transducing apparatus and having a permanent magnet oriented so that the direction of its magnetization is substantially parallel to the path of tape movement. The tape is further guided for angular contact with the boundary surface of the magnet so that its movement past the magnet will effectively simulate a decreasing alternating magnetic field.

PATENTED DEC 15 1970 3,548,113

INVENTOR.
HORST ALTHUBER
BY
Frank R. Trifari
AGENT

PATENTED DEC 15 1970 3,548,113

INVENTOR.
HORST ALTHUBER

SHAPED PERMANENT MAGNET ERASING DEVICE FOR MAGNETIZABLE RECORD CARRIERS

The invention relates to an erasing device for magnetizable record carriers or tapes comprising a single permanent magnet wherein the direction of magnetization extends substantially parallel to the direction of travel of the record carrier.

In known erasing devices using a direct magnetic field produced by a permanent magnet, the tape commonly exhibits stronger noise properties than a tape erased by an alternating magnetic field. In order to obviate this disadvantage efforts have been made to cause a plurality of consecutive magnets having different directions of magnetization to act upon the tape to be erased. It has been attempted to orientate the direction of magnetization of the individual magnets not only at right angles to the direction of movement of the tape but also parallel thereto. In this way an alternating magnetic field was imitated with the result that the noise properties of a tape thus erased were, indeed, improved. It has furthermore been endeavored to arrange a single magnet with its direction of magnetization parallel to the tape and to imitate an alternating field by means of a plurality of pole pieces, arranged on the magnet and cooperating with the tape. However, such steps require a costly and bulky construction.

Accordingly this invention overcomes the difficulties referred to above by providing tape-guiding means cooperating with the magnet and adapted to bring a record carrier to be erased into contact with a boundary face of the magnet extending substantially parallel to the direction of magnetization thereof and facing the tape, while the positions of the magnet and tape guiding means in the direction of movement of the tape are relatively movable, so that the tape portion leaving the boundary face can be at an acute angle to said face. By means of such an erasing device a very satisfactory erasing effect is obtainable and the noise properties of the erased tape are substantially the same as that obtained by erasure with a high-frequency alternating magnetic field. This is apparently due to the fact that the tape leaving the boundary face gradually traverses a magnetic field whose field-strength-vector decreases in value, while the polarization changes.

In a preferred embodiment the tape-guiding means is formed by a pin of nonmagnetizable material, while the magnet is formed by a rectangular block, the record carrier to be erased being brought into contact with the boundary of said block opposite the tape and extending parallel to the direction of magnetization.

It has been found to be particularly advantageous to shape the boundary face of the block facing the tape and extending substantially parallel to the direction of magnetization at least partly in the form of a cylindrical surface, and on either side of the magnet a guide pin is provided as a tape-guiding means. The term cylindrical surface intended to denote and include other curvatures and variants thereof; it has been found for example, that a circular cylindrical surface and a parabolic-cylindrical surface may be used for the boundary face. Favorable results have also been obtained by means of a wedge-shaped boundary face, the edge of the wedge being rounded off. In these cases it has been found to be particularly efficacious to choose a radius of curvature of the cylindrical surface, at least in the contact area with the tape, between 0.3 and 4 mms, preferably at about 1 mm.

The path of a tape to be erased is preferably chosen so that the tape moving towards the boundary face is at an angle of more than 150°, preferably about 165° to the tape moving away from said face.

In order to compensate for tolerances, for example, of the direction of magnetization of the magnet and the disposition of the tape guiding means it has been found to be efficacious to arrange the magnet on a support in order to obtain an optimum erasing effect, said support being adapted to be pivoted and to be fixed in the desired position about an axis extending at right angles to the direction of travel of the tape and parallel to the boundary face of the magnet, along which a record carrier to be erased is guided.

The invention will now be described more fully with reference to the drawings showing several embodiments, to which the invention is not however, restricted.

FIGS. 3a to d show various embodiments of erasing magnets; FIG. 3a also indicates the travel of the tape.

Figure 3:
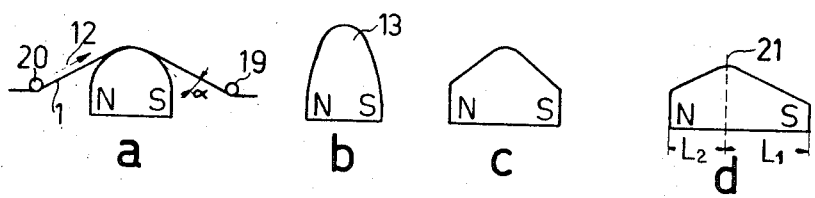
Figure 4:
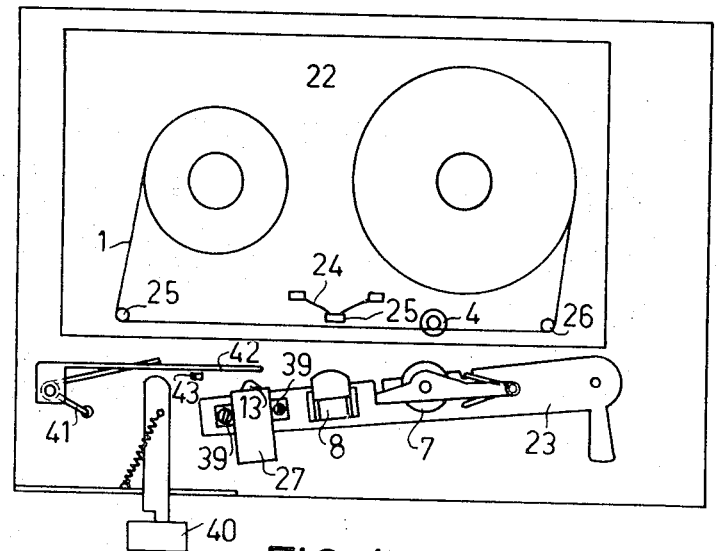
Figures 5, 6:
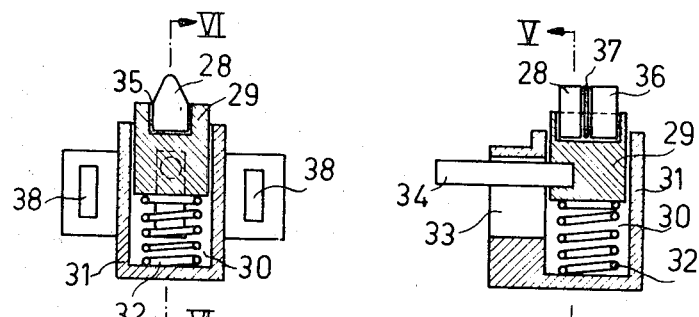

FIG. 4 shows an apparatus comprising an erasing device with a magnet as shown in FIG. 3 and FIG. 5 in a plan view.

FIG. 6 a side elevation and partly in a sectional view.

Figure 7:
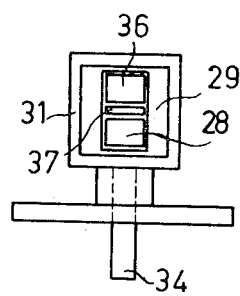

FIG. 7 is a view from the tape of the magnet system in detail.

Figure 1:
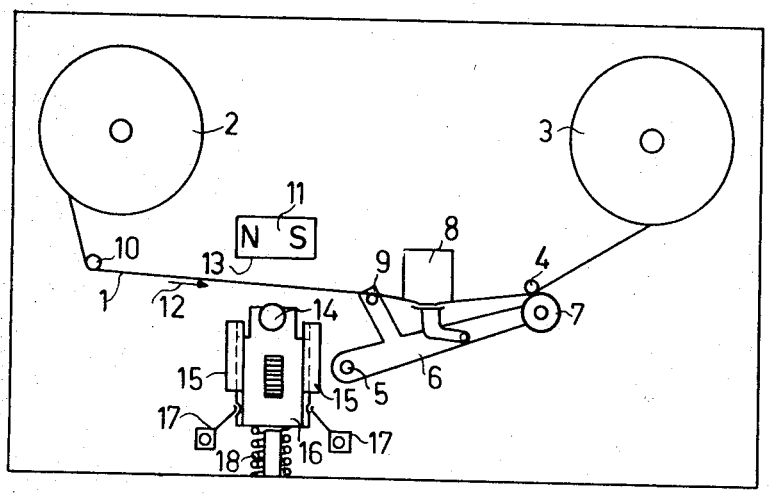
FIG. 1 shows diagrammatically a recording and playback apparatus in the "playback" position, so that the erasing device is out of operation.

FIG. 1 shows a recording and playback apparatus in the "playback" position. The record carrier 1 is wound off a supply spool 2 and rewound on the spool 3. The tape 1 is driven by a driving shaft 4, against which the tape is urged by means of a capstan 7, arranged on a lever 6, adapted to pivot about a shaft 5. The tape is scanned by a magnetic head 8. Pins 9 and 10 serve for obtaining the correct course of the tape.

The erasing device is formed by a magnet 11, whose direction of magnetization is determined by the poles N and S parallel to the direction of travel 12 of the tape. The magnet has the shape of a rectangular block having a boundary face 13, extending parallel to the direction of magnetization and facing the tape travel 12. There is furthermore provided a pin 14 of nonmagnetizable material, which serves as a tape-guiding means. This pin is arranged on a support 16, adapted to be guided along two U-shaped paths 15 in its longitudinal direction towards the boundary face 13 of the magnet 11 or away therefrom. By means of two locking members 17, formed by spring elements gripping into recesses of the support, this support is held in place against the action of a spring 18 in the position shown in FIG. 1. In this position the distance between the boundary face 13 of the magnet and the pin is so large that the tape can pass in between these two parts without being hindered, the tape travelling at such a distance from the magnet that any record of the tape is not affected or erased by the magnetic field.

Figure 2:
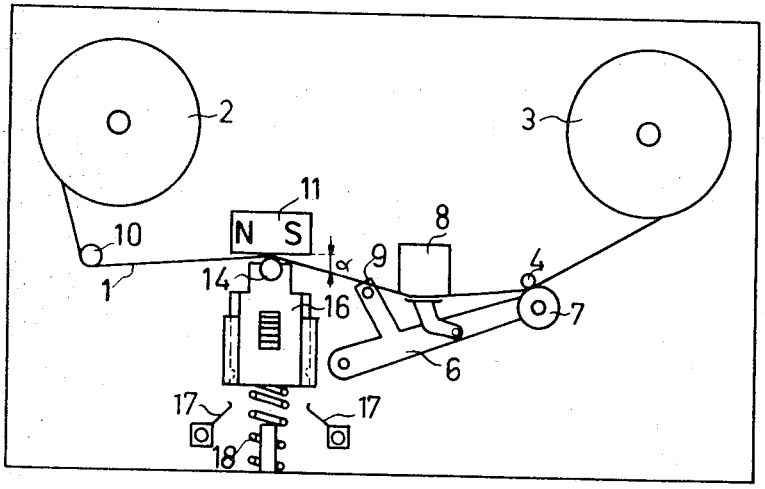
FIG. 2 shows the same apparatus in the "recording" position, the tape being erased by means of said device before a new record is made.

By simple manual pressure towards the magnet 11, the support 16 is disengaged from the locking members 17, after which the support is displaced by the spring 18 towards the magnet 11 so that a tape travelling between the magnet and the pin 14 is brought into contact with the boundary face 13 of the magnet. This situation is illustrated in FIG. 2. The pin 14 urges the tape 1 against the boundary face 13. With the aid of the two further tape guiding pins 9 and 10 it provides a path of the tape, in which the tape 1 is moved at an acute angle towards the boundary face 13 of the magnet until it comes into contact with said face, after which the tape is moved away from the boundary face again at an acute angle.

Along this path of the tape towards the boundary face 13 and away therefrom the tape passes through a magnetic field which first increases and then decreases in intensity, while the polarity of the field changes. Although only a single magnet affects the tape, it has been found that the tape is perfectly erased without the noise properties of the tape appreciably affected adversely. This may in the first place be attributed to the fact that, when the tape is moved away from the boundary face, it traverses a field having not only a decreasing intensity but also a different polarity.

FIGS. 3a to d show a few advantageous embodiments of the boundary face 13 of the magnet in the form of at least partly cylindrical surfaces. These magnets cooperate with tape-guiding means formed, for example, by guide pins 19, 20 and arranged, viewed in the direction of travel 12 of the tape 1, before and after the magnet respectively. If a tape should not be erased, the position of the magnet and of the tape guiding means is such that the tape passes by the magnet at an adequate distance. For erasing purposes the tape is guided towards the magnet by either moving the magnet towards the path of the tape or the tape guiding means towards the magnet.

FIG. 3a shows a magnet having a circle-cylindrical boundary face 13 opposite the path 12 of the tape. The radius of curvature is advantageously chosen between 0.3 and 4 mms. Particularly advantageous has been found to be a value of about 1 mm. If the radius of curvature is too small, the tape is loaded fairly strongly; if the radius of curvature is too large, however, the noise properties of an erased tape are reduced. In this respect it is, of course, the distance over which the magnet passes into the path of the tape during erasion and hence the angle between the tape portion travelling towards the boundary face 13 and the tape portion travelling away therefrom which are also important. When this angle is chosen to be more than 150°, preferably about 165°, very good results are obtained. From the foregoing it will be obvious that in order to obtain satisfactory noise properties of an erased tape it is in the first place essential that the tape portion moving away from the bounding face should be at an acute angle α to said face.

FIG. 3b shows a boundary face 13 in the form of a parabolic-cylindrical surface. In FIG. 3c the boundary face has the shape of a wedge having a rounded-off edge. Such embodiments provide good results when the wedge faces are at an angle of more than 90°, preferably about 130° to each other. It has been found to be advantageous to choose a shorter length of the wedge face on the side of the incoming tape portion than that of the wedge face on the side of the outgoing tape portion. FIG. 3d shows an embodiment of this kind in which the ratio between the lengths L1 and L2 is about 1.5, which has been found to be particularly efficacious. Wedge-shaped boundary faces also provide the possibility to arrange the wedge faces with different slopes with respect to the plane going through the edge 21 and being at right angles to the direction of magnetization.

FIG. 4 shows a recording and playback apparatus in which the tape 1, arranged in a magazine 22, is arranged with said magazine on the driving members of the apparatus. The capstan 7, which cooperates with the driving shaft 4, projecting through an opening of the magazine, is arranged together with the magnet head 8 on a pivotable support 23. When the support is turned towards the magazine, the capstan and the magnetic head pass through openings of the narrow side of the magazine into the magazine. In order to urge the tape against the magnetic head 8 a felt plate 25 is provided on a spring bracket in the magazine. A pin 20 serves for guiding the tape on the side of the supply spool and a pin 26 guides the tape on the side of the receiving spool.

The erasing device 27 is also arranged on the pivotable support 23. FIGS. 5, 6 and 7 show that the erasing device comprises a block-shaped, nonmagnetic part 29, supporting the magnet 28, for example of "magnadur." The part 29 is displaceable in a tubular opening 30 of a supporting body 31 against the action of a spring 32. The supporting body has an elongated hole 33, through which a pin 34, connected with the block 29, projects to the outside. One purpose of the pin 34 is to limit the outward movement of the block 29 and hence of the magnet from the supporting body 31 to the maximum extent. The magnet 28 is fastened in the block 29 by affixing same within recess 35 in the block. Since the apparatus concerned has a tape with two tracks lying one above the other, and since only one of which tracks is being erased at a time, the magnet has a width corresponding to the width of one track and hence slightly smaller than half the width of the tape. However, in order to guide the tape over the whole width, a nonmagnetic tape guiding member 36 is fixedly arranged in the recess 35 and in order to avoid an undesired erasure of the other track a magnetic plate 37 is provided, said two members having the same sectional shape as the magnet. The supporting body finally has elongated holes 38 so that it can be adjustably secured by means of screws 39 to the support 23.

For optional erasure of a tape a key 40 (FIG. 4) can be fixed in an operational position. This key actuates a lever 42, controlled by a spring 41 and bearing on a stop 43 in the rest position of the key, when no erasure is to be carried out. The lever 42 extends into the path of the pin 34 of the magnet, when the magnet and support 23 is moved towards the magazine; the supporting body can also project into the magazine space through a further opening in the said narrow side of the magazine.

The operation is such that, when the tape is not to be erased, the key 40 is left in rest position shown in FIG. 4. When the support 23 is turned towards the magazine, the pin 34 butts against the lever 42. The pin 34 is thus prevented from following the movement of the support 23 and the block 29 with the magnet 28 is held in position and pushed back in the opening 30 of the supporting body 31 against the action of the spring 32. In the operational state of the support 23, in which the capstan 7 cooperates with the driving shaft 4 and the magnetic head 8 cooperates with the felt plate 25, the magnet does not come into contact with the tape.

If a tape is to be erased, the lever 42 is pivoted by means of the key 40 out of the path of the pin 34. When the support 23 is moved towards the magazine, the pin 34 does not encounter any resistance so that the magnet stays in its position out of the supporting body 31. When the magnetic head 8 reaches the tape, the magnet comes into contact with the tape. The travel of the tape along the boundary face 13 of the magnet is thus determined by the pin 20 and the contact area of the head 3 and the felt plate 25, operating as tape guiding means in accordance with the distance over which the magnet extends into the magazine so that the angle between the tape portion moving towards the boundary face 13 and the latter and the angle between the tape portion moving away from the boundary face and the latter are also determined. As stated above, the magnet system is arranged on the support so as to be adjustable by means of the screws 39, so that the magnet can be pivoted about an axis at right angles to the direction of movement of the tape and parallel to the boundary face 13 and hence an optimum adjustable relative to the path of the tape can be obtained, since the angle can thus be varied.

Many variants of the above embodiments are, of course, possible within the scope of the invention, particularly with respect to the form of the boundary face of the magnet, to the material thereof, to the arrangement of the tape-guiding means for fixing the path of the tape and like. By way of example, it should be noted that the magnet may also be formed by a cylindrical rod of a corresponding diameter, magnetized transversely of the longitudinal axis.

I claim:

1. A low residual noise level magnetic tape-erasing device for use with a transducing apparatus and comprising a permanent magnet adapted to be movably positioned relative to the magnetic tape, said magnet being oriented with respect to the path of tape movement such that its direction of magnetization is substantially parallel to said tape movement, the permanent magnet further defining a curved boundary surface for coaction with the tape, and means for selectively moving the permanent magnet into engagement with the tape for guiding same along a path which describes an acute angle with the boundary surface thereby effectively simulating a decreasing alternating magnetic field.

2. An erasing device claimed in claim 1 wherein the permanent magnet defines a circular shaped boundary surface.

3. An erasing device as claimed in claim 1 wherein the permanent magnet defines a parabolic shaped boundary surface.

4. An erasing device as claimed in claim 1 wherein the radius of curvature of the boundary surface is at least 0.3 mms. and no greater than 4 mms.

5. An erasing device as claimed in claim 1 wherein the tape path movement about the boundary face describes an angle between that portion of the tape moving toward the boundary face and that position moving away from the boundary face, said angle being greater than 150°.

6. An erasing device as claimed in claim 1 wherein the means for selectively moving the permanent magnet into engagement with the tape comprises a supporting body for mounting the permanent magnet, said supporting body being affixed to a pivotable arm for displacing the supporting body and permanent magnet toward the tape, spring means within the supporting body resiliently securing the permanent magnet thereto, and lever means actuated by an operating key of the apparatus for selectively intercepting movement of the permanent magnet toward the tape whereby said pivotal movement of the supporting body will be absorbed by the spring means.

7. An erasing device as claimed in claim 1 wherein the permanent magnet is wedge-shaped and has a curved edge defining the boundary surface.

8. An erasing device as claimed in claim 7 wherein the wedge-shaped magnet has two faces forming an angle therebetween greater than 90°.

9. An erasing device as claimed in claim 8 wherein the wedge faces are of different lengths and the shorter of the wedge faces is positioned to confront the tape as it moves toward the magnet.